(12) United States Patent
Ge et al.

(10) Patent No.: US 12,379,634 B2
(45) Date of Patent: Aug. 5, 2025

(54) DISPLAY DEVICE AND DISPLAY PANEL THEREOF

(71) Applicant: Wuhan China Star Optoelectronics Technology Co., Ltd., Hubei (CN)

(72) Inventors: Haosen Ge, Hubei (CN); Mang Zhao, Hubei (CN); Qiang Gong, Hubei (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 17/915,562

(22) PCT Filed: Aug. 5, 2022

(86) PCT No.: PCT/CN2022/110502
§ 371 (c)(1),
(2) Date: Sep. 29, 2022

(87) PCT Pub. No.: WO2024/016391
PCT Pub. Date: Jan. 25, 2024

(65) Prior Publication Data
US 2024/0280867 A1 Aug. 22, 2024

(30) Foreign Application Priority Data
Jul. 19, 2022 (CN) .......................... 202210851806.6

(51) Int. Cl.
*G02F 1/1362* (2006.01)
*G06F 3/041* (2006.01)
(52) U.S. Cl.
CPC .. *G02F 1/136286* (2013.01); *G02F 1/136209* (2013.01)

(58) Field of Classification Search
CPC ........... G02F 1/136286; G02F 1/13338; G02F 1/136209; G02F 1/134309;
(Continued)

(56) References Cited

U.S. PATENT DOCUMENTS

| | | | |
|---|---|---|---|
| 2011/0063535 A1 | 3/2011 | Chang et al. | |
| 2012/0133865 A1* | 5/2012 | Yonemura | G02F 1/133528 349/110 |

(Continued)

FOREIGN PATENT DOCUMENTS

| | | |
|---|---|---|
| CN | 108646481 | 10/2018 |
| CN | 109388265 | 2/2019 |

(Continued)

OTHER PUBLICATIONS

International Search Report and the Written Opinion Dated Dec. 16, 2022 From the International Searching Authority Re. Application No. PCT/CN2022/110502 and Its Translation Into English. (17 Pages).

(Continued)

*Primary Examiner* — Angela M. Medich

(57) ABSTRACT

A display device and a display panel thereof are provided by embodiments of the present application, wherein the display panel includes a plurality of pixel regions distributed in a light-shielding matrix, each of the pixel regions includes at least three sub-pixel light-emitting regions; and the display panel includes data lines, touch lines, and a light-shielding matrix layer. The present application solves a technical problem that an aperture ratio of a display panel is not high in the prior art, and contrast of a displayed image of the display panel is affected.

16 Claims, 5 Drawing Sheets

(58) Field of Classification Search
CPC .. G02F 1/133512; G06F 3/041; G06F 3/0414; G06F 3/04142; G06F 3/0488; G06F 3/04886; G06F 2203/0339; G06F 3/0412; G06F 3/04164; G06F 3/0443; G06F 3/0336

See application file for complete search history.

(56) References Cited

U.S. PATENT DOCUMENTS

| | | | | |
|---|---|---|---|---|
| 2014/0159086 | A1* | 6/2014 | Yu | G02F 1/136209 |
| | | | | 257/98 |
| 2017/0031488 | A1* | 2/2017 | Shim | G06F 3/044 |
| 2018/0067592 | A1* | 3/2018 | Kimura | G06F 3/047 |
| 2018/0321782 | A1* | 11/2018 | Qin | G06F 3/047 |
| 2019/0391430 | A1* | 12/2019 | Morinaga | G02F 1/134309 |
| 2020/0278587 | A1* | 9/2020 | Fukami | H01L 27/124 |
| 2021/0018781 | A1* | 1/2021 | Chen | G02F 1/13338 |
| 2022/0005836 | A1* | 1/2022 | Wang | G06F 3/0412 |
| 2024/0162244 | A1* | 5/2024 | Wang | G06F 3/04164 |

FOREIGN PATENT DOCUMENTS

| | | | |
|---|---|---|---|
| CN | 109521609 | 3/2019 | |
| CN | 109582179 | 4/2019 | |
| CN | 109683743 | 4/2019 | |
| CN | 109979317 | 7/2019 | |
| CN | 110346987 | 10/2019 | |
| CN | 110928069 | 3/2020 | |
| CN | 111766977 | 10/2020 | |
| CN | 112860117 | 5/2021 | |
| CN | 113196155 | 7/2021 | |
| CN | 113820883 | 12/2021 | |
| CN | 114077077 | 2/2022 | |
| WO | WO 2013/191024 | 12/2013 | |
| WO | WO-2018150989 A1 * | 8/2018 | ......... G02F 1/13338 |

OTHER PUBLICATIONS

Notification of Office Action and Search Report Dated Mar. 28, 2023 From the State Intellectual Property Office of the People's Republic of China Re. Application No. 202210851806.6 and Its Translation Into English. (16 Pages).

* cited by examiner

DISPLAY DEVICE AND DISPLAY PANEL THEREOF

RELATED APPLICATIONS

This application is a National Phase of PCT Patent Application No. PCT/CN2022/110502 having International filing date of Aug. 5, 2022, which claims the benefit of priority of Chinese Patent Application No. 202210851806.6 filed on Jul. 19, 2022. The contents of the above applications are all incorporated by reference as if fully set forth herein in their entirety.

FIELD AND BACKGROUND OF THE INVENTION

The present application relates to a field of display technology, and in particular to a display device and a display panel thereof.

At present, touch display panels can be divided into two categories: off-screen touch and on-screen touch according to a position of touch signal lines. A liquid crystal display panel is composed of an array substrate, a color filter substrate, and a liquid crystal layer sandwiched therebetween, the touch display panels of an on-screen touch type integrate a touch function into an inside of a display panel, which does not occupy a thickness space outside the display panel, thus reducing a thickness of a touch display device and becoming a current mainstream touch control mode.

However, in a current on-screen touch display panel, there are some problems that widths of light-shielding bars of a black light-shielding matrix are overly large, which occupies excessively large areas of light-emitting regions of sub-pixels, resulting in a certain degree of decrease in an aperture ratio of an entire panel compared with the off-screen touch, which affects contrast of a displayed image of the display panel.

SUMMARY OF THE INVENTION

Embodiments of the present application provide a display device and a display panel thereof, which can solve a technical problem in the prior art that an aperture ratio of a display panel is not high, and contrast of a displayed image of the display panel is affected.

The embodiment of the present application provides a display panel, wherein the display panel includes a plurality of pixel regions distributed in a light-shielding matrix, each of the pixel regions is provided with at least three sub-pixel light-emitting regions, and at least one of the sub-pixel light-emitting regions includes an independent first sub light-emitting region and a second sub light-emitting region; wherein the display panel includes:
  a plurality of data lines, each of the plurality of data lines arranged at intervals along a first direction;
  a plurality of scan lines, each of the plurality of scan lines arranged at intervals along a second direction; the scan lines and the data lines defining a plurality of sub-pixels, and every at least three of the sub-pixels forming a pixel;
  a plurality of touch lines, each of the touch lines located between adjacent two of the data lines and arranged along the first direction in at least one of the sub-pixels; wherein the touch lines and the data lines are disposed in a same layer; and
  a light-shielding matrix layer including a plurality of first light-shielding bars, a plurality of second light-shielding bars and a plurality of third light-shielding bars; each of the first light-shielding bars disposed on one of the data lines, and orthographic projections of the first light-shielding bars on a plane where the plurality of the data lines are located covering the data lines one to one; each of the second light-shielding bars disposed on one of the touch lines, and orthographic projections of the second light-shielding bars on a plane where the touch lines are located covering the touch lines one to one; each of the third light-shielding bars disposed on one of the scan lines, and orthographic projections of the third light-shielding bars on a plane where the scan lines are located covering the scan lines.

Optionally, the touch lines divide light-emitting regions of the sub-pixels into first sub light-emitting regions and second sub light-emitting regions, and areas of the first sub light-emitting regions are not equal to areas of the second sub light-emitting regions.

Optionally, widths of the first sub light-emitting regions and widths of the second sub light-emitting regions are greater than 2 micrometers.

Optionally, ends of the orthographic projections of the third light-shielding bars on the plane where the scan lines are located exceed ends of the data lines on a same side as the ends of orthographic projections of the third light-shielding bars, distances between the ends of the orthographic projections of the third light-shielding bars and the ends of the scan lines are no more than 2 micrometers.

Optionally, ends of the orthographic projections of the first light-shielding bars on the plane where the plurality of the data lines are located exceed ends of the data lines on a same side as the ends of orthographic projections of the first light-shielding bars, distances between the ends of the orthographic projections of the first light-shielding bars and the ends of the data lines are no more than 2 micrometers, and ends of the orthographic projections of the second light-shielding bars on the plane where the touch lines are located exceed ends of the touch lines on a same side as the ends of orthographic projections of the second light-shielding bars, distances between the ends of the orthographic projections of the second light-shielding bars and the ends of the touch lines are no more than 2 micrometers.

Optionally, the display panel further includes a plurality of pixel electrodes, and the pixel electrodes are disposed above the touch lines and are located below the second light-shielding bars.

Optionally, orthographic projections of the pixel electrodes on the plane where the plurality of the touch lines are located cover the touch lines.

Optionally, the pixel electrodes include a plurality of electrode branches arranged along the first direction.

Optionally, the pixel is provided with one of the touch lines.

Optionally, the pixel is provided with the plurality of the touch lines, and a number of the touch lines provided in one of the sub-pixels is less than two.

Correspondingly, the embodiment of the present application also provides a display device, including:
  a housing;
  a display panel, the display panel mounted in the housing, wherein the display panel includes a plurality of data lines, a plurality of scan lines, a plurality of touch lines, and a light-shielding matrix layer; each of the plurality of data lines arranged at intervals along a first direction; each of the plurality of scan lines arranged at intervals along a second direction; the scan lines and the data lines defining a plurality of sub-pixels, and every at least three of the sub-pixels forming a pixel; each of the touch lines located between adjacent two of the data lines and arranged along the first direction in at least one of the sub-pixels; the touch lines and the data lines are disposed in a same layer; and the light-shielding matrix layer includes a plurality of first light-shielding bars, a plurality of second light-shielding bars, and a plurality of third light-shielding bars; each of the first light-shielding bars disposed on one of the data lines, and orthographic projections of the first light-shielding bars on a plane where the plurality of the data lines are located covering the data lines one to one; each of the second light-shielding bars disposed on one of the touch lines, and orthographic projections of the second light-shielding bars on a plane where the touch lines are located covering the touch lines one to one; each of the third light-shielding bars disposed on one of the scan lines, and orthographic projections of the third light-shielding bars on a plane where the scan lines are located covering the scan lines.

Optionally, the touch lines divide light-emitting regions of the sub-pixels into first sub light-emitting regions and second sub light-emitting regions, and areas of the first sub light-emitting regions are not equal to areas of the second sub light-emitting regions.

Optionally, widths of the first sub light-emitting regions and widths of the second sub light-emitting regions are greater than 2 micrometers.

Optionally, ends of the orthographic projections of the third light-shielding bars on the plane where the scan lines are located exceed ends of the data lines on a same side as the ends of orthographic projections of the third light-shielding bars, distances between the ends of the orthographic projections of the third light-shielding bars and the ends of the scan lines are no more than 2 micrometers.

Optionally, ends of the orthographic projections of the first light-shielding bars on the plane where the plurality of the data lines are located exceed ends of the data lines on a same side as the ends of orthographic projections of the first light-shielding bars, distances between the ends of the orthographic projections of the first light-shielding bars and the ends of the data lines are no more than 2 micrometers, and ends of the orthographic projections of the second light-shielding bars on the plane where the touch lines are located exceed ends of the touch lines on a same side as the ends of orthographic projections of the second light-shielding bars, distances between the ends of the orthographic projections of the second light-shielding bars and the ends of the touch lines are no more than 2 micrometers.

Optionally, the display panel further includes a plurality of pixel electrodes, and the pixel electrodes are disposed above the touch lines and are located below the second light-shielding bars.

Optionally, orthographic projections of the pixel electrodes on a plane where the plurality of the touch lines are located cover the touch lines.

Optionally, the pixel electrodes include a plurality of electrode branches arranged along the first direction.

Optionally, the pixel is provided with one of the touch lines.

Optionally, the pixel is provided with the plurality of the touch lines, and a number of the touch lines provided in one of the sub-pixels is less than two.

In embodiments of the present application, the data lines and the touch lines originally disposed on a same side of the light-emitting regions of the sub-pixels are separately arranged; the data lines are still disposed on sides of the light-emitting regions of the sub-pixels, and the touch lines are disposed in middles of the light-emitting regions of the sub-pixels, so the light-shielding bar originally located above the data lines and the touch lines for covering the data lines and the touch lines at the same time is divided into the first light-shielding bars located above the data lines for covering the data lines and the second light-shielding bars located above the touch lines for covering the touch lines; the second light-shielding bars are located in the middles of the light-emitting regions of the sub-pixels, and divide the light-emitting regions of the sub-pixels into the first sub light-emitting regions and the second sub light-emitting regions. In an embodiment of the present application, total widths of the first light-shielding bars and the second light-shielding bars are less than widths of the light-shielding bars covering the data lines and the touch lines simultaneously in the prior art, so that widths of the light-emitting regions of the sub-pixels on the display panel is increased, thereby increasing area ratios of the light-emitting regions of the sub-pixels on the display panel, and solving the technical problem in the prior art that the aperture ratio of the display panel is not high, and the contrast of the displayed image of the display panel is affected.

BRIEF DESCRIPTION OF THE SEVERAL VIEWS OF THE DRAWINGS

In order to more clearly illustrate the embodiments or the technical solutions of the existing art, the drawings illustrating the embodiments, or the existing art will be briefly described below. The drawings in the following description merely illustrate some embodiments of the present application. Other drawings may also be obtained by those skilled in the art according to these figures without paying creative work.

Figure 1:
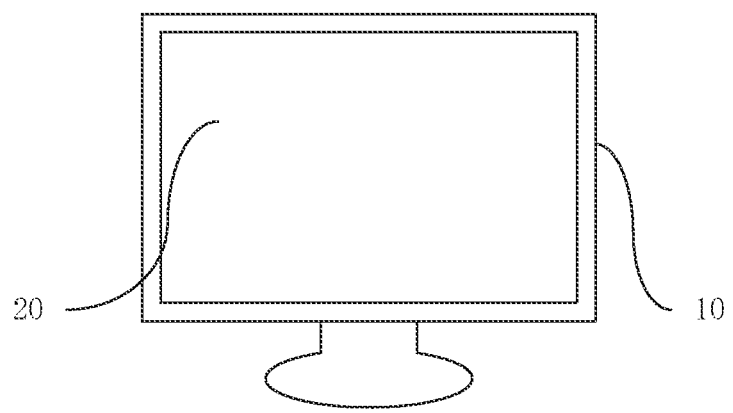
FIG. 1 is a schematic structural diagram of a display device provided by an embodiment of the present application.

DESCRIPTION OF REFERENCE NUMBERS 10. shell; 20. display panel; 21. first sub-pixel light-emitting region; 22. second sub-pixel light-emitting region; 23. third sub-pixel light-emitting region; 24. fourth sub-pixel light-emitting region; 100. array substrate; 200. color film substrate; 300. liquid crystal layer; 400. sealant; 101. first substrate; 102. scan lines; 103. first insulating layer; 104. data lines; 105. touch lines; 106. second insulating layer; 107. common electrode layer on side of array substrate; 108. third insulating layer; 109. pixel electrodes; 110. control switches; 210. second substrate; 220. light-shielding matrix layer; 230. color resist layer; 240. planarization layer; 221. first light-shielding bars; 222. second light-shielding bars; 223. third light-shielding bars; 224. light-emitting regions; 2241. first sub light-emitting region; 2242. second sub light-emitting regions.

DESCRIPTION OF SPECIFIC EMBODIMENTS OF THE INVENTION

Technical solutions in embodiments of the present application will be clearly and completely described below with reference to the drawings in the embodiments of the present application, obviously, the described embodiments are only a part of the embodiments of the present application, rather than all the embodiments. Based on the embodiments in the present application, all other embodiments obtained by those skilled in the art without creative efforts shall fall within the protection scope of the present application. In addition, it should be understood that the specific embodiments described herein are only used to illustrate and explain the present application, but not to limit the present application. In the present application, unless otherwise stated, directional words used such as "upper" and "lower" generally refer to the upper and lower sides of the device in actual use or working state, specifically the drawing direction in the accompanying drawings; while "inside" and "outside" refer to the outline of a device.

Embodiments of the present application provide a display device and a display panel 20 thereof. Each of them will be described in detail below. It should be noted that an order of description of following embodiments is not a limitation on the preferred order of the embodiments.

The present application provides a display device, the display device can be mounted in various products having a display function. For example, electronic products can be smart terminals, notebook computers, photographic equipment, wearable devices, electronic scales, vehicle-mounted displays, televisions, and the like.

Figure 3:
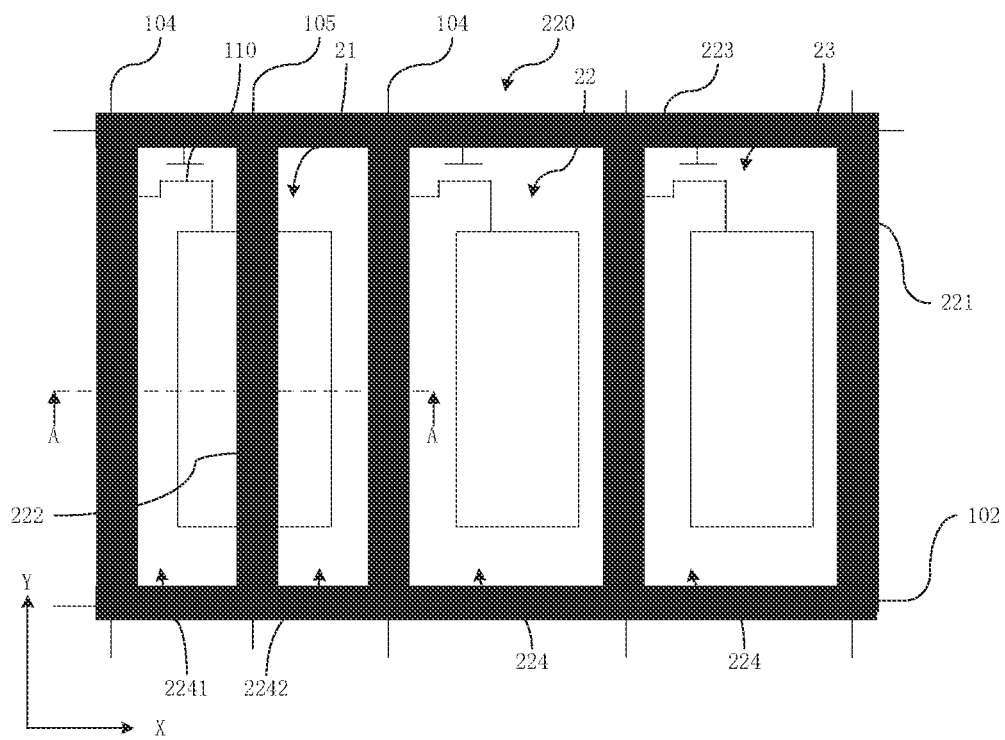
FIG. 3 is a partial structural diagram of a pixel region of the display panel provided by a first embodiment of the present application.

Referring to FIG. 1 and FIG. 3, the display device includes a housing 10 and a display panel 20 mounted in the housing 10. The display panel 20 is provided with a plurality of pixels distributed in a light-shielding matrix. Each of the pixels includes at least three sub-pixel light-emitting regions, namely a first sub-pixel light-emitting region 21, a second sub-pixel light-emitting region 22, and a third sub-pixel light-emitting region 23.

Figure 2:
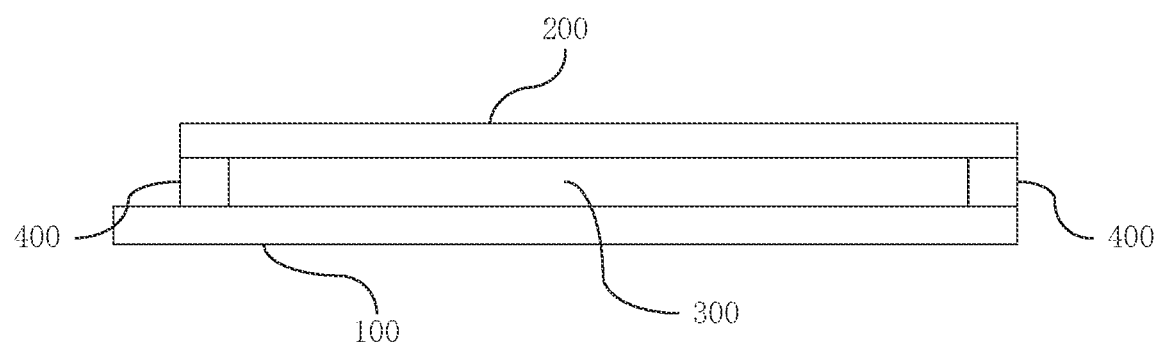
FIG. 2 is a schematic diagram of a hierarchical structure of a display panel provided by an embodiment of the present application.

Please refer to FIG. 2 in combination, the display panel 20 includes an array substrate 100, a color filter substrate 200, a liquid crystal layer 300, and a sealant 400. The liquid crystal layer 300 and the sealant 400 are disposed between the array substrate 100 and the color filter substrate 200, and the sealant 400 is located on both sides of the liquid crystal layer 300 for bonding the array substrate 100 and the color filter substrate 200 together.

Figure 4:
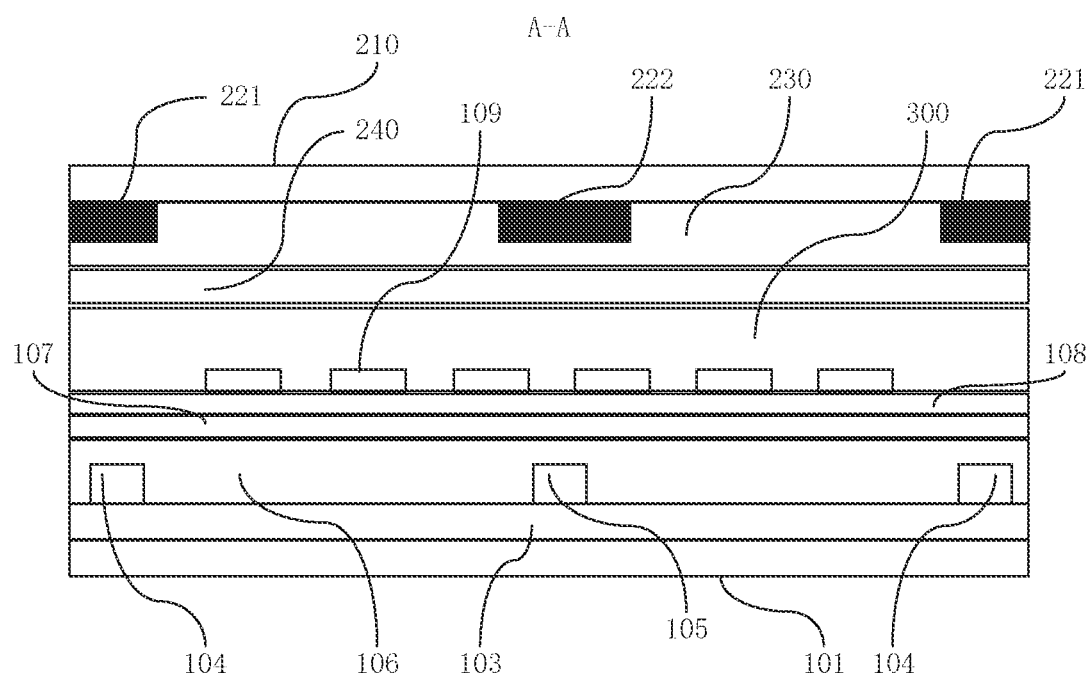
FIG. 4 is a cross-sectional view taken along a section line A-A in FIG. 3.

Referring to FIG. 3 and FIG. 4 in combination, the array substrate 100 includes a first substrate 101, a plurality of scan lines 102, a first insulating layer 103, a plurality of data lines 104, a plurality of touch lines 105, a second insulating layer 106, a common electrode layer 107 on a side of the array substrate, a third insulating layer 108, pixel electrodes 109, and control switches 110.

The scan lines 102 are disposed on a side of the first substrate 101 facing the color filter substrate 200 and are arranged at intervals along a second direction, and extend along a first direction. The first insulating layer 103 is disposed on a side of the first substrate 101 where the scan lines 102 are arranged, and covers each of the scan lines 102 together with the first substrate 101 to isolate the scan lines 102 from an outside; on one hand, the scan lines 102 are insulated from the outside, and on another hand, water vapor or dust particles are prevented from intruding the scan lines 102. The data lines 104 and the touch lines 105 are disposed in a same layer, and are disposed on a side of the first insulating layer 103 facing away from the first substrate 101. The data lines 104 are disposed on the first insulating layer 103 at intervals along the first direction and extend along the second direction. Each of the touch lines 105 is disposed between adjacent two of the data lines 104, and two sides of each of the touch lines 105 are spaced from the adjacent two of the data lines 104 respectively. The second insulating layer 106 is disposed on a surface of the first insulating layer 103 where the data lines 104 and the touch lines 105 are arranged, and, together with the first insulating layer 103, cover each of the data lines 104 and each of the touch lines 105, so that the data lines 104 and the touch lines 105 are isolated from the outside. On the one hand, insulation of the data lines 104 and the touch lines 105 from the outside is realized, and on another hand, the water vapor or dust particles are prevented from intruding the data lines 104 and the touch lines 105. A common electrode layer 107 on the side of the array substrate is disposed on a side of the second insulating layer 106 facing away from the first insulating layer 103, and forms storage capacitors together with the pixel electrodes 109. The third insulating layer 108 is disposed on one side of the common electrode layer 107 facing away from the second insulating layer 106. The pixel electrodes 109 are disposed on a side of the third insulating layer 108 facing away from the common electrode layer 107 on the side of the array substrate, and are in contact with the liquid crystal layer 300, and orthographic projections of the pixel electrodes on a plane where the touch lines 105 are located coincide with the touch lines 105. In some embodiments of the present application, each of the pixel electrodes 109 includes a plurality of electrode branches arranged along the first direction. Source and drain electrodes of the control switches 110 are electrically connected to the data lines 104 and the pixel electrodes 109 respectively, and gate electrodes of the control switches 110 are electrically connected to the scan lines 102 to realize control of sub-pixels of the display panel 20. In the embodiments of the present application, an X direction is the first direction, a Y direction is the second direction, and the first direction and the second direction are perpendicular to each other. The scan lines 102 and the data lines 104 define a plurality of sub-pixels, and every at least three of the sub-pixels form a pixel.

The color filter substrate 200 includes a second substrate 210, a light-shielding matrix layer 220, a color resist layer 230, and a planarization layer 240.

The light-shielding matrix layer 220 is disposed on the second substrate 210 and has a plurality of light-emitting regions 224. The color resist layer 230 is disposed on a side of the light-shielding matrix layer 220 facing away from a substrate layer, and fills the light-emitting regions 224. The planarization layer 240 is disposed on a surface of the color resist layer 230 facing away from the light-shielding matrix layer, and a surface of the planarization layer 240 facing away from the color resist layer 230 is in contact with the liquid crystal layer 300 to connect the color filter substrate 200 and the liquid crystal layer 300.

The light-shielding matrix layer 220 includes first light-shielding bars 221, second light-shielding bars 222, and third light-shielding bars 223. The first light-shielding bars 221 are disposed above the data lines 104 for covering the data lines 104, and the first light-shielding bars 221 and the data lines 104 are in a one-to-one correspondence; the second light-shielding bars 222 are disposed above the touch lines 105, and the second light-shielding bars 222 and the touch lines 105 are in a one-to-one correspondence; the third light-shielding bars 223 are disposed above the scan lines 102, and the third light-shielding bars 223 and the scan lines 102 are in a one-to-one correspondence.

Each of the data lines 104 is located at a first side of each of the sub-pixel light-emitting regions, and each of the scan lines 102 is located at a second side of each of the sub-pixel light-emitting regions. A region formed by an intersection of adjacent two of the data lines 104 and adjacent two of the scan lines 102 is one of the sub-pixel light-emitting regions; that is, a plurality of the first light-shielding bars 221 and a plurality of the third light-shielding bars 223 intersect in pairs to form a plurality of the sub-pixel light-emitting regions.

Each of the touch lines 105 is located in a middle of the sub-pixel light-emitting regions, and divides the sub-pixel light-emitting regions into first sub light-emitting regions 2241 and second sub light-emitting regions 2242; that is, each of the touch lines 105 is located between the first sub light-emitting regions 2241 and the second sub light-emitting regions 2242 of a same sub-pixel light-emitting region.

Wherein areas of the first sub light-emitting regions 2241 and areas of the second sub light-emitting regions 2242 can be equal or not be equal. Generally, the areas of the first sub light-emitting regions 2241 are disposed to be smaller than the areas of the second sub light-emitting regions 2242, so that the sub-pixels have higher brightness to ensure a display effect of the display panel 20.

Figure 5:
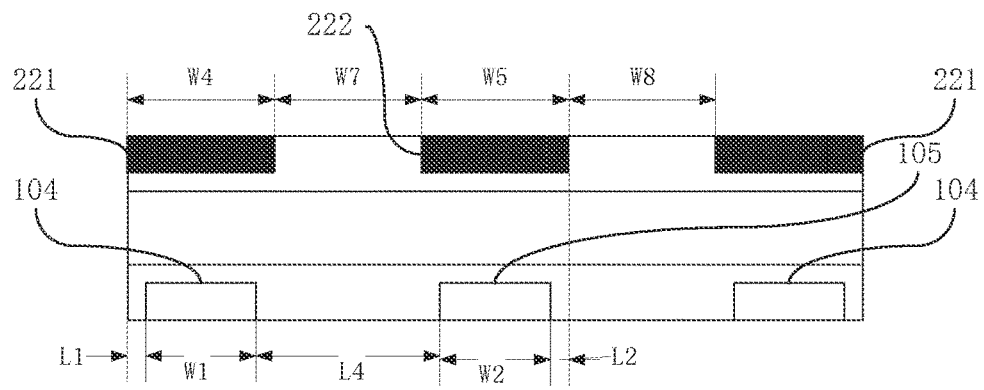
FIG. 5 is a dimensioning diagram according to an embodiment shown in FIG. 4.
Figure 6:
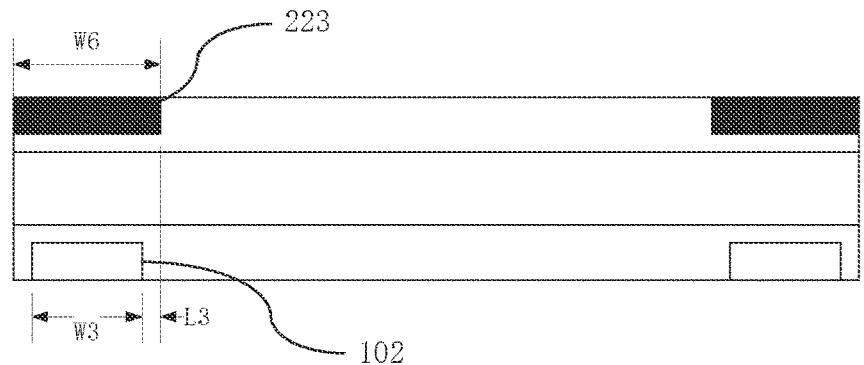
FIG. 6 is a dimensioning diagram of another angle according to the embodiment shown in FIG. 5.

In some embodiments of the present application, please refer to FIG. 5 and FIG. 6 in combination, ends of the orthographic projections of the first light-shielding bars 221 on the plane where the plurality of the data lines 104 are located exceed ends of the data lines 104 on a same side as the ends of orthographic projections of the first light-shielding bars 221, distances L1 between ends of the orthographic projections of the first light-shielding bars 221 and the ends of the data lines 104 are no more than 2 micrometers, ends of the orthographic projections of the second light-shielding bars 222 on the plane where the touch lines 105 are located exceed ends of the touch lines 105 on a same side as the ends of orthographic projections of the second light-shielding bars 222, distances L2 between ends of the orthographic projections of the second light-shielding bars 222 and the ends of the touch lines 105 are no more than 2 micrometers, ends of the orthographic projections of the third light-shielding bars 223 on the plane where the scan lines 102 are located exceed ends of the scan lines 102 on a same side as the ends of orthographic projections of the third light-shielding bars 223, distances L3 between ends of the orthographic projections of the third light-shielding bars 223 and the ends of the scan lines 102 are no more than 2 micrometers, thereby further increasing an area ratio of light-emitting regions in an entire display panel 20; that is, an aperture ratio of the display panel 20 is increased, so that contrast of the display panel 20 is further improved, thereby having a better display effect.

In one embodiment of the present application, widths W1 of the data lines 104, widths W2 of the touch lines 105, and widths W3 of the scan lines 102 are not more than 3 micrometers, and widths W4 of the first light-shielding bars 221, widths W5 of the second light-shielding bars 222, and widths W6 of the third light-shielding bars 223 are not more than 4 micrometers, thereby increasing the area ratio of the light-emitting regions in the entire display panel 20, that is, the aperture ratio of the display panel 20 is increased, so that the contrast of the display panel 20 is further improved, thereby having a better display effect under a premise of ensuring normal electrical signal transmission.

Widths W7 of the first sub light-emitting regions 2241 and widths W8 of the second sub light-emitting regions 2242 are greater than 2 micrometers, so as to ensure that there are sufficient distances between the data lines 104 and the touch lines 105 adjacent thereto to prevent distances between the data lines 104 and the touch lines 105 from being too close. Wherein the above-mentioned widths W7 of the first sub light-emitting regions 2241 refer to distances between the first light-shielding bars 221 and the second light-shielding bars 222 on opposite sides of the first sub light-emitting regions 2241, and the above-mentioned widths W8 of the second sub light-emitting regions 2242 refer to distances between the first light-shielding bars 221 and the second light-shielding bars 222 on opposite sides of the second sub light-emitting regions 2242. If the distances between the data lines 104 and the touch lines 105 are too close, it is easy to form electrical connections between the data lines 104 and the touch lines 105, resulting in a short circuit phenomenon; at the same time, the distances being too close also increase difficulty of a manufacturing process of the display panel 20, lead to a decrease in a yield of manufacturing of the display panel 20, and increase manpower and material resources for the manufacturing of the display panel 20.

In the embodiment of the present application, for example, the widths of the data lines 104 and the widths of the touch lines 105 are 3 micrometers, the distances L4 between the data lines 104 and the touch lines 105 are 5 micrometers, and the sides of the first light-shielding bars 221 extend sides of the data lines 104 on the same side as the sides of the first light-shielding bars 221, the distances L1 between sides of the first light-shielding bars 221 and the data lines 104 are 2 micrometers, and the sides of the second light-shielding bars 222 extend sides of the touch lines 105 on the same side as the sides of the second light-shielding bars 222, the distances L2 between sides of the second light-shielding bars 222 and the touch lines 105 are 2 micrometers. If the touch lines 105 are provided in the sub-pixel light-emitting regions, when the data lines 104 and the touch lines 105 are provided separately, that is, when there are two of the sub-light-emitting regions in one of the sub-pixel light-emitting regions, total widths of a corresponding one of the first light-shielding regions 221 and a corresponding one of the second light-shielding regions 222 are 3 micrometers+2*2 micrometers+3 micrometers+2*2 micrometers, that is, 14 micrometers. In a case where the data lines 104 and the touch lines 105 are disposed together, that is, in a case where the sub-pixel light-emitting regions are not divided into the first sub light-emitting regions 2241 and the second sub light-emitting regions 2242, the total widths of corresponding ones of the light-shielding bars are 3 micrometer+5 micrometers+3 micrometers+2*2 micrometers, that is, 15 micrometers. That is, the technical solution of the present application reduces the total widths of the light-shielding bars of the light-shielding matrix layer 220 per unit area by 1 micrometer compared to a solution of the prior art, and correspondingly, the total widths of the light-emitting regions of the sub-pixels are also increased by 1 micrometer. The area ratio of the sub-pixels light-emitting region also increases accordingly, which increases the aperture ratio of the display panel 20, solving the technical problem that the aperture ratio of the display panel 20 in the prior art is not high, which affects the contrast of the display panel 20.

In the above-described embodiment, sums of the distances L1 of the sides of the first light-shielding bars 221 beyond the same sides of the data lines 104 and the distances L2 of the sides of the second light-shielding bars 222 beyond the same sides of the touch lines 105 are not more than the distances L4 between the data lines 104 and the touch lines 105.

In the embodiment of the present application, directions of the touch lines 105 and directions of the data lines 104 are approximately same, and certain distances are always kept between each other, so as to prevent occurrence of the short circuit phenomenon caused by the electrical connections between the data lines 104 and the touch lines 105 in the manufacturing process or in use due to the distances between the data lines 104 and the touch lines 105 being to close.

Correspondingly, directions of the second light-shielding bars 222 and the first light-shielding bars 221 are also approximately same, and certain distances are always kept between each other.

In some embodiments, there are small angles between the touch lines 105 and the data line 104, but the certain distances are always maintained between each other. Correspondingly, there are small angles between the first light-shielding bars 221 and the second light-shielding bars 222, but the certain distances are always maintained between each other, so as to ensure that the second light-shielding bars 222 provided corresponding to the touch lines 105 passes through regions with a dimmer brightness in the sub-pixel light-emitting regions, so that the sub-pixels have a higher brightness and the display effect of the display panel 20 is ensured.

In other embodiments, the touch lines 105 and the data lines 104 are parallel to each other, and correspondingly, the first light-shielding bars 221 and the second light-shielding bars 222 are also parallel to each other.

For example, in one embodiment of the present application, in a part of pixel regions, the first sub-pixel light-emitting regions 21 are provided with the first sub light-emitting regions 2241 and the second sub light-emitting regions 2242. In another part of the pixel regions, the second sub-pixel light-emitting regions 22 are provided with the first sub light-emitting regions 2241 and the second sub light-emitting regions 2242. However, ratios of areas corresponding to the first sub-pixel light-emitting regions 21 to areas corresponding to the second sub-pixel light-emitting regions 22 to areas corresponding to the third sub-pixel light-emitting regions 23 are equal, and the ratios can be 1:1:1, or can also be 1:0.8:1, etc., which is set according to an actual display effect required, and is not limited here.

In the embodiment of the present application, one of the pixel regions can correspond to one of the touch lines 105, or can also correspond to the plurality of touch lines 105, but at most one of the touch lines 105 is disposed in one of the sub pixel light-emitting regions. In the sub-pixel light-emitting regions provided with the touch lines 105, the second light-shielding bars 222 divide the sub-pixel light-emitting regions into the first sub light-emitting regions 2241 and the second sub light-emitting regions 2242.

Please continue to refer to FIG. 3, in a first embodiment of the present application, each of the pixel regions of the display panel 20 includes the first sub-pixel light-emitting region 21, the second sub-pixel light-emitting region 22, and the third sub-pixel light-emitting region 23 corresponding to a red sub-pixel light-emitting region, a green sub-pixel light-emitting region, and a blue sub-pixel light-emitting region, respectively. In one of the pixel regions, a ratio of an area corresponding to the first sub-pixel light-emitting region 21 to an area corresponding to the second sub-pixel light-emitting region 22 to an area corresponding to the third sub-pixel light-emitting region 23 is 1:1:1. In this embodiment, each of the pixel regions corresponds to one of the touch lines 105, and the one of the touch lines 105 is disposed in the first sub-pixel light-emitting region 21 and divides the first sub-pixel light-emitting region 21 into the first sub light-emitting region 2241 and the second sub light-emitting region 2242. That is, in this embodiment, a ratio of a sum of an area of the first sub-light emitting region 2241 and an area of the second sub-light emitting region 2242 to an area corresponding to the second sub-pixel light-emitting region 22 to an area corresponding to the third sub-pixel light-emitting region 23 is 1:1:1. In other embodiments, the touch lines 105 can also be disposed in the second sub-pixel light-emitting region 22 or the third sub-pixel light-emitting region 23, which is not limited here, as long as the ratio of the area corresponding to the first sub-pixel light-emitting region 21 to the area corresponding to the second sub-pixel light-emitting region 22 to the area corresponding to the third sub-pixel light-emitting region 23 is maintained to be 1:1:1.

Figure 7:
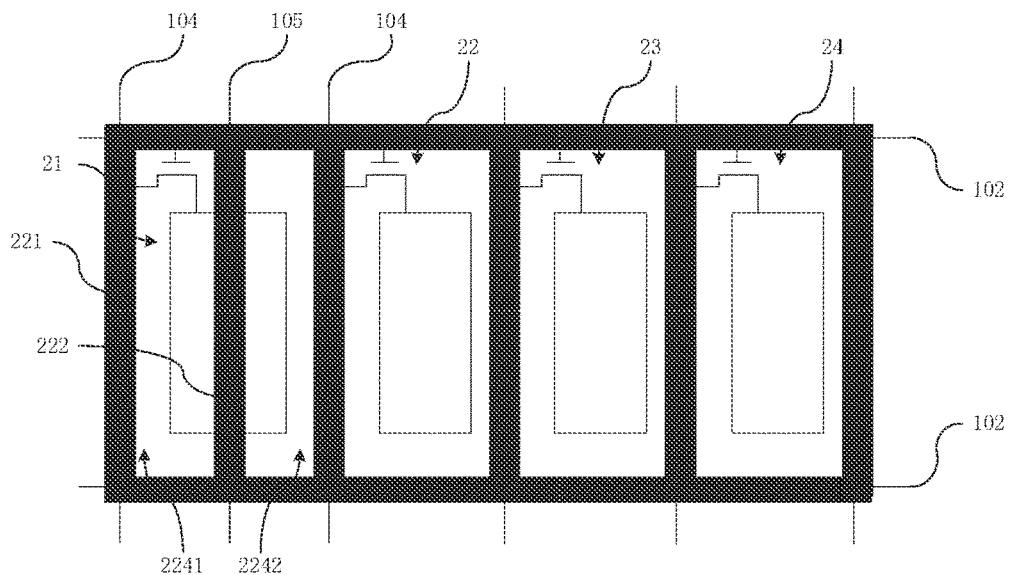
FIG. 7 is a partial structural diagram of the pixel region of the display panel provided by a second embodiment of the present application.

Please refer to FIG. 7, in a second embodiment of the present application, each of the pixel regions of the display panel 20 includes the first sub-pixel light-emitting region 21, the second sub-pixel light-emitting region 22, the third sub-pixel light-emitting region 23, and a fourth sub-pixel light-emitting region 24 corresponding to the red sub-pixel light-emitting region, the green sub-pixel light-emitting region, the blue sub-pixel light-emitting region, and a white sub-pixel light-emitting region, respectively. In one of the pixel regions, a ratio of the area corresponding to the first sub-pixel light-emitting region 21 to the area corresponding to the second sub-pixel light-emitting region 22 to the area corresponding to the third sub-pixel light-emitting region 23 to an area corresponding to the fourth sub-pixel light-emitting region 24 is 1:1:1:1. In this embodiment, each of the pixel regions corresponds to one of the touch lines 105, and the one of the touch lines 105 is disposed in the first sub-pixel light-emitting region 21 and divides the first sub-pixel light-emitting region 21 into the first sub light-emitting region 2241 and the second sub light-emitting region 2242. That is, in this embodiment, ratios of the sum of the area of the first sub light-emitting region 2241 and the area of the second sub light-emitting region 2242 to the area corresponding to the second sub-pixel light-emitting region 22 to the area corresponding to the third sub-pixel light-emitting region 23 to the area corresponding to the fourth sub-pixel light-emitting region is 1:1:1:1. In other embodiments, the touch lines 105 can also be disposed in the second sub-pixel light-emitting region 22, the third sub-pixel light-emitting region 23, or the fourth sub-pixel light-emitting region 24, which is not limited here, as long as the ratio of the area corresponding to the first sub-pixel light-emitting region 21 to the area corresponding to the second sub-pixel light-emitting region 22 to the area corresponding to the third sub-pixel light-emitting region 23 to the area corresponding to the fourth sub-pixel light-emitting region 24 is maintained to be 1:1:1:1.

Figure 8:
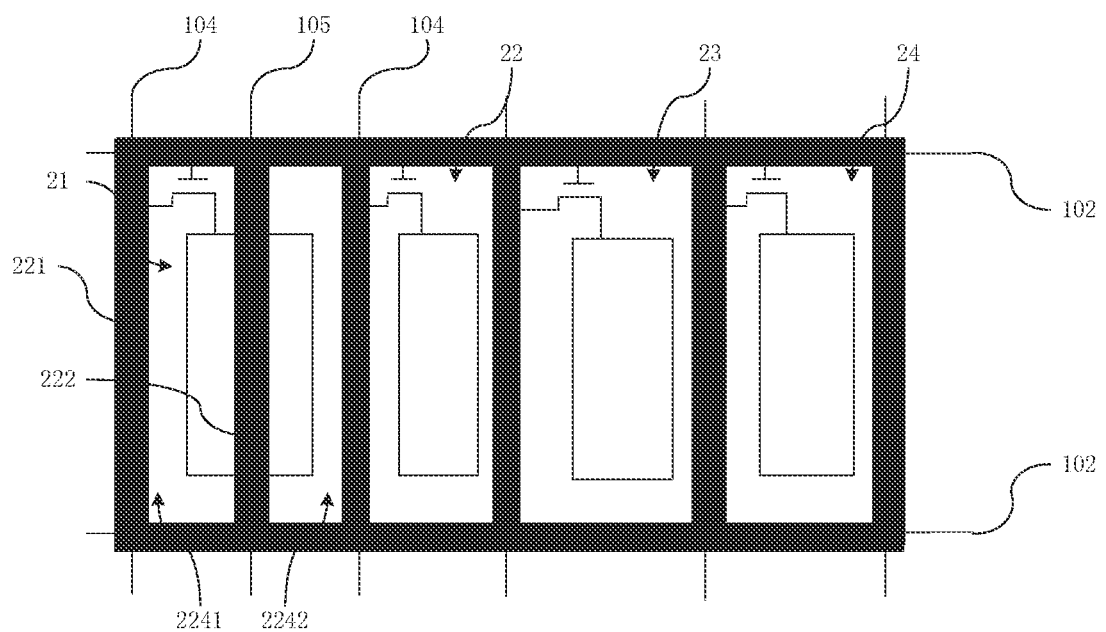
FIG. 8 is a partial structural diagram of the pixel region of the display panel provided by a third embodiment of the present application.

Please refer to FIG. 8, in a third embodiment of the present application, each of the pixel regions of the display panel 20 includes the first sub-pixel light-emitting region 21, the second sub-pixel light-emitting region 22, the third sub-pixel light-emitting region 23, and the fourth sub-pixel light-emitting region 24 corresponding to the red sub-pixel light-emitting region, a first green sub-pixel light-emitting region, the blue sub-pixel light-emitting region, and a second green sub-pixel light-emitting region respectively. In one of the pixel regions, a ratio of the area corresponding to the first sub-pixel light-emitting region 21 to the area corresponding to the second sub-pixel light-emitting region 22 to the area corresponding to the third sub-pixel light-emitting region 23 to the area corresponding to the fourth sub-pixel light-emitting region 24 is 1:0.5:1:0.5. In this embodiment, each of the pixel regions corresponds to one of the touch lines 105, and the one of the touch lines 105 is disposed in the first sub-pixel light-emitting region 21 and divides the first sub-pixel light-emitting region 21 into the first sub light-emitting region 2241 and the second sub light-emitting region 2242. That is, in this embodiment, the ratio of the sum of the area of the first sub light-emitting region 2241 and the area of the second sub light-emitting region 2242 to the area corresponding to the second sub-pixel light-emitting regions 22 to the area corresponding to the third sub-pixel light-emitting region 23 to the area corresponding to the fourth sub-pixel light-emitting region is 1:0.5:1:0.5. In other embodiments, the touch lines 105 can also be disposed in the second sub-pixel light-emitting region 22, the third sub-pixel light-emitting region 23, or the fourth sub-pixel light-emitting region 24, which is not limited here, as long as the ratio of the area corresponding to the first sub-pixel light-emitting region 21 to the area corresponding to the second sub-pixel light-emitting region 22 to the area corresponding to the third sub-pixel light-emitting region 23 to the area corresponding to the fourth sub-pixel light-emitting region is maintained to be 1:0.5:1:0.5.

Figure 9:
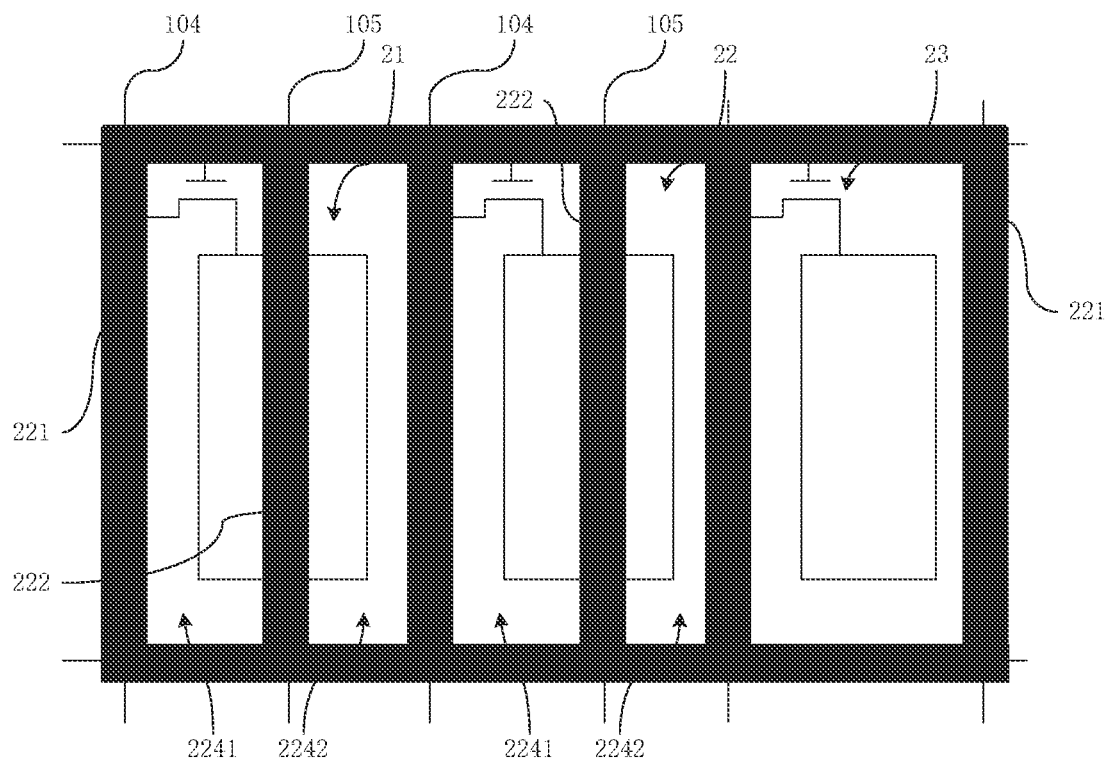
FIG. 9 is a partial structural diagram of the pixel region of the display panel provided by a fourth embodiment of the present application.

Please refer to FIG. 9, in a fourth embodiment of the present application, each of the pixel regions of the display panel 20 includes the first sub-pixel light-emitting region 21, the second sub-pixel light-emitting region 22, and the third sub-pixel light-emitting region 23 corresponding to the red sub-pixel light-emitting region, the green sub-pixel light-emitting region, and the blue sub-pixel light-emitting region, respectively. In one of the pixel regions, the ratio of the area corresponding to the first sub-pixel light-emitting region 21 to the area corresponding to the second sub-pixel light-emitting region 22 to the area corresponding to the third sub-pixel light-emitting region 23 is 1:1:1. In this embodiment, each of the pixel regions corresponds to two of the touch lines 105, and the two of the touch lines 105 are disposed in the first sub-pixel light-emitting region 21 and the second sub-pixel light-emitting region 22, respectively, and divide corresponding to the first sub-pixel light-emitting region 21 into the first sub light-emitting region 2241 and the second sub light-emitting region 2242, and divide corresponding to the second sub-pixel light-emitting region 21 into the first sub light-emitting region 2241 and the second sub light-emitting region 2242. That is, in this embodiment, a ratio of the sum of the area of the first sub light-emitting region 2241 and the area of the second sub light-emitting region 2242 corresponding to the first sub-pixel light-emitting region 21 to a sum of the area of the first sub light-emitting region 2241 and the area of the second sub light-emitting region 2242 corresponding to the second sub-pixel light-emitting region 22 to the area corresponding to the third sub-pixel light-emitting region 23 is 1:1:1. In other embodiments, the two of the touch lines 105 can also be disposed in the second sub-pixel light-emitting region 22 and the third sub-pixel light-emitting region 23, or the two of the touch lines 105 can also be disposed in the third sub-pixel light-emitting region 23 and the first sub-pixel light-emitting region 21, which is not limited here, as long as the ratio of the area corresponding to the first sub-pixel light-emitting region 21 to the area corresponding to the second sub-pixel light-emitting region 22 to the area corresponding to the third sub-pixel light-emitting region 23 is maintained to be 1:1:1.

Figure 10:
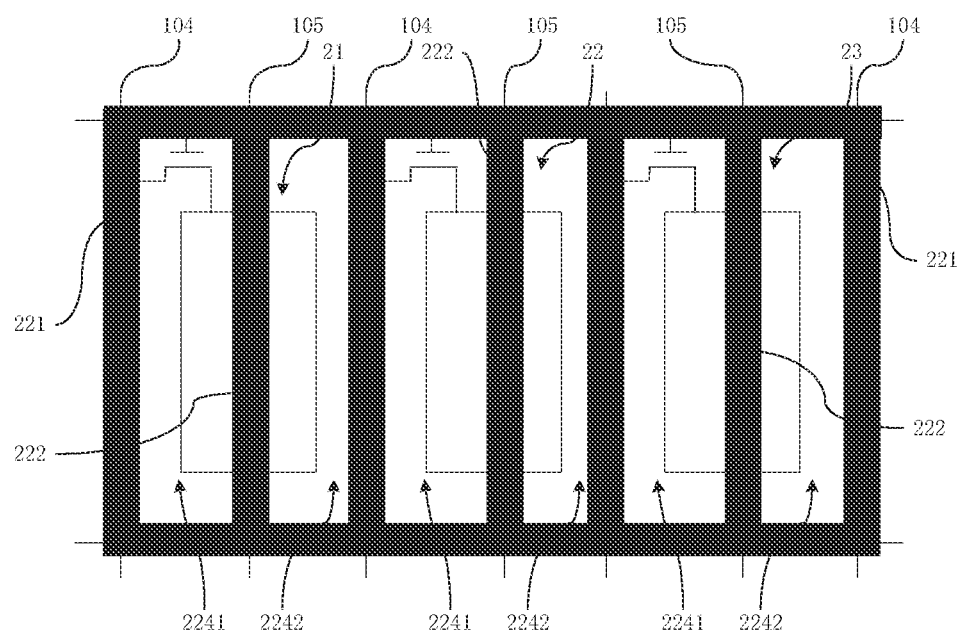
FIG. 10 is a partial structural diagram of the pixel region of the display panel provided by a fifth embodiment of the present application.

Please refer to FIG. 10, in a fifth embodiment of the present application, each of the pixel regions of the display panel 20 includes the first sub-pixel light-emitting region 21, the second sub-pixel light-emitting region 22, and the third sub-pixel light-emitting region 23 corresponding to the red sub-pixel light-emitting region, the green sub-pixel light-emitting region, and the blue sub-pixel light-emitting region, respectively. In one of the pixel regions, the ratio of the area corresponding to the first sub-pixel light-emitting region 21 to the area corresponding to the second sub-pixel light-emitting region 22 to the area corresponding to the third sub-pixel light-emitting region 23 is 1:1:1. In this embodiment, the first sub-pixel light-emitting region 21, the second sub-pixel light-emitting region 22, and the third sub-pixel light-emitting region 23 are provided with the touch lines 105, which divides each of the first sub-pixel light-emitting region 21, the second sub-pixel light-emitting region 22, and the third sub-pixel light-emitting region 23 into the first sub light-emitting region 2241 and the second sub light-emitting region 2242. That is, in the embodiment, a ratio of the sum of the area of the first sub light-emitting region 2241 and the area of the second sub light-emitting region 2242 corresponding to the first sub-pixel light-emitting region 21 to the sum of the area of the first sub light-emitting region 2241 and the area of the second sub light-emitting region 2242 corresponding to the second sub-pixel light-emitting region 22 to a sum of the area of the first sub light-emitting region 2241 and the second sub light-emitting region 2242 corresponding to the third sub-pixel light-emitting region 23 is 1:1:1.

The display device and the display panel 20 thereof provided by the embodiments of the present application are described in detail above, and the principle and implementation mode of the present application are described by applying specific examples in this paper. The description of the above embodiments is only used to help understand the method and its core idea of the present application. Meanwhile, for those skilled in the art, according to the idea of the present application, there will be changes in the specific implementation mode and application scope. In summary, the contents of this specification should not be understood as limiting the present application.

What is claimed is:

1. A display panel, wherein the display panel comprises: a plurality of data lines, each of the plurality of data lines is arranged at intervals along a first direction; a plurality of scan lines, each of the plurality of scan lines is arranged at intervals along a second direction; the scan lines and the data lines define a plurality of sub-pixels, and every at least three of the sub-pixels forms a pixel; a plurality of touch lines, each of the touch lines located between two adjacent data lines and arranged along the first direction in at least one of the sub-pixels; wherein the touch lines and the data lines are disposed in a same layer; and a light-shielding matrix layer comprising a plurality of first light-shielding bars, a plurality of second light-shielding bars and a plurality of third light-shielding bars; each of the first light-shielding bars is disposed on one of the data lines, and orthographic projections of the first light-shielding bars on a plane where the plurality of the data lines are located cover the data lines one to one; each of the second light-shielding bars is disposed on one of the touch lines, and orthographic projections of the second light-shielding bars on a plane where the touch lines are located cover the touch lines one to one; each of the third light-shielding bars is disposed on one of the scan lines, and orthographic projections of the third light-shielding bars on a plane where the scan lines are located cover the scan lines; wherein each of the first light-shielding bars is spaced apart from the plurality of second light-shielding bars; wherein the second light-shielding bars divide light-emitting regions of the sub-pixels into first sub light-emitting regions and second sub light-emitting regions, and areas of the first sub light-emitting regions are not equal to areas of the second sub light-emitting regions; and wherein widths of the first sub light-emitting regions and widths of the second sub light-emitting regions are greater than 2 micrometers.

2. The display panel as claimed in claim 1, wherein ends of the orthographic projections of the third light-shielding bars on the plane where the scan lines are located exceed ends of the data lines on a same side as the ends of orthographic projections of the third light-shielding bars, distances between the ends of the orthographic projections of the third light-shielding bars and the ends of the scan lines are no more than 2 micrometers.

3. The display panel as claimed in claim 1, wherein ends of the orthographic projections of the first light-shielding bars on the plane where the plurality of the data lines are located exceed ends of the data lines on a same side as the ends of orthographic projections of the first light-shielding bars, distances between the ends of the orthographic projections of the first light-shielding bars and the ends of the data lines are no more than 2 micrometers, and ends of the orthographic projections of the second light-shielding bars on the plane where the touch lines are located exceed ends of the touch lines on a same side as the ends of orthographic projections of the second light-shielding bars, distances between the ends of the orthographic projections of the second light-shielding bars and the ends of the touch lines are no more than 2 micrometers.

4. The display panel as claimed in claim 1, wherein the display panel further comprises a plurality of pixel electrodes, and the pixel electrodes are disposed above the touch lines and are located below the second light-shielding bars.

5. The display panel as claimed in claim 4, wherein orthographic projections of the pixel electrodes on the plane where the plurality of the touch lines are located cover the touch lines.

6. The display panel as claimed in claim 4, wherein the pixel electrodes comprise a plurality of electrode branches arranged along the first direction.

7. The display panel as claimed in claim 1, wherein the pixel is provided with one of the touch lines.

8. The display panel as claimed in claim 1, wherein the pixel is provided with the plurality of the touch lines, and a number of the touch lines provided in one of the sub-pixels is less than two.

9. A display device, comprising: a housing; a display panel, the display panel mounted in the housing, wherein the display panel comprises a plurality of data lines, a plurality of scan lines, a plurality of touch lines, and a light-shielding matrix layer; each of the plurality of data lines is arranged at intervals along a first direction; each of the plurality of scan lines is arranged at intervals along a second direction; the scan lines and the data lines define a plurality of sub-pixels, and every at least three of the sub-pixels form a pixel; each of the touch lines is located between two adjacent data lines and arranged along the first direction in at least one of the sub-pixels; the touch lines and the data lines are disposed in a same layer; and the light-shielding matrix layer comprises a plurality of first light-shielding bars, a plurality of second light-shielding bars, and a plurality of third light-shielding bars; each of the first light-shielding bars is disposed on one of the data lines, and orthographic projections of the first light-shielding bars on a plane where the plurality of the data lines are located cover the data lines one to one; each of the second light-shielding bars is disposed on one of the touch lines, and orthographic projections of the second light-shielding bars on a plane where the touch lines are located cover the touch lines one to one; each of the third light-shielding bars is disposed on one of the scan lines, and orthographic projections of the third light-shielding bars on a plane where the scan lines are located cover the scan lines; wherein each of the first light-shielding bars is spaced apart from the plurality of second light-shielding bars; wherein the second light-shielding bars divide light-emitting regions of the sub-pixels into first sub light-emitting regions and second sub light-emitting regions, and areas of the first sub light-emitting regions are not equal to areas of the second sub light-emitting regions; and wherein widths of the first sub light-emitting regions and widths of the second sub light-emitting regions are greater than 2 micrometers.

10. The display device as claimed in claim 9, wherein ends of the orthographic projections of the third light-shielding bars on the plane where the scan lines are located exceed ends of the data lines on a same side as the ends of orthographic projections of the third light-shielding bars, distances between the ends of the orthographic projections of the third light-shielding bars and the ends of the scan lines are no more than 2 micrometers.

11. The display device as claimed in claim 9, wherein ends of the orthographic projections of the first light-shielding bars on the plane where the plurality of the data lines are located exceed ends of the data lines on a same side as the ends of orthographic projections of the first light-shielding bars, distances between the ends of the orthographic projections of the first light-shielding bars and the ends of the data lines are no more than 2 micrometers, and ends of the orthographic projections of the second light-shielding bars on the plane where the touch lines are located exceed ends of the touch lines on a same side as the ends of orthographic projections of the second light-shielding bars, distances between the ends of the orthographic projections of the second light-shielding bars and the ends of the touch lines are no more than 2 micrometers.

12. The display device as claimed in claim 9, wherein the display panel further comprises a plurality of pixel electrodes, and the pixel electrodes are disposed above the touch lines and are located below the second light-shielding bars.

13. The display device as claimed in claim 12, wherein orthographic projections of the pixel electrodes on a plane where the plurality of the touch lines are located cover the touch lines.

14. The display device as claimed in claim 12, wherein the pixel electrodes comprise a plurality of electrode branches arranged along the first direction.

15. The display device as claimed in claim 9, wherein the pixel is provided with one of the touch lines.

16. The display device as claimed in claim 9, wherein the pixel is provided with the plurality of the touch lines, and a number of the touch lines provided in one of the sub-pixels is less than two.

* * * * *